US008832564B2

(12) United States Patent
McCoy et al.

(10) Patent No.: US 8,832,564 B2
(45) Date of Patent: Sep. 9, 2014

(54) PERSONALIZED SECOND DISPLAY BROWSING EXPERIENCE DUE TO MULTIPLE SESSION FEATURE

(75) Inventors: Charles McCoy, Coronado, CA (US); Ling Jun Wong, Escondido, CA (US); True Xiong, San Diego, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 788 days.

(21) Appl. No.: 13/077,181

(22) Filed: Mar. 31, 2011

(65) Prior Publication Data

US 2012/0210245 A1    Aug. 16, 2012

Related U.S. Application Data

(60) Provisional application No. 61/441,866, filed on Feb. 11, 2011.

(51) Int. Cl.
*G06F 3/0482* (2013.01)
*G06F 3/16* (2006.01)

(52) U.S. Cl.
CPC .............. *G06F 3/0482* (2013.01); *G06F 3/162* (2013.01)
USPC ......................................... 715/747; 715/721

(58) Field of Classification Search
CPC ......... G06F 3/162; G06F 3/165; G06F 3/167; G06F 3/0482; G06F 3/0484
USPC ......... 715/747, 745, 746, 719–726, 821–822, 715/811–813, 825; 725/27
See application file for complete search history.

(56) References Cited

U.S. PATENT DOCUMENTS

| 6,483,523 | B1 | 11/2002 | Feng |
| 7,324,838 | B2 * | 1/2008 | Tarle ............................. 455/566 |
| 7,607,582 | B2 * | 10/2009 | Vallabh et al. ........... 235/472.01 |
| 8,051,453 | B2 * | 11/2011 | Arseneau et al. ............... 725/94 |
| 8,060,609 | B2 * | 11/2011 | Banger et al. ................. 709/225 |
| 8,607,271 | B2 * | 12/2013 | Seppala ......................... 725/39 |

(Continued)

FOREIGN PATENT DOCUMENTS

| CN | 101247493 | 8/2008 |
| CN | 101536520 | 9/2009 |

OTHER PUBLICATIONS

Towards Personalized TV for Concurrent Use: Unlocking the Potential of IMS-Based IPTV. Abstract. IEEE Xplore. Nov. 30, 2009. http://ieeexplore.ieee.org/search/freesrchabstract.jsp?reload=true&tp=&arnumber=536071.

*Primary Examiner* — Steven Sax

(57) ABSTRACT

Systems and methods are provided to allow users to browse services, content items, or the like using a personalized user interface. Thus, for example, users can browse content offerings on the second display in a language and font set that are personalized to themselves. Users may also browse offerings that match a parental ratings setting, and use a background image and layout of their choice. The second displays generally do not require additional investment by the user because the same make use of a device, e.g., a smartphone, laptop computer, tablet computer, an internet appliance, a desktop computer, etc., which most users would already have in their possession. Such a second display is a significant complement to an IPTV because of the second display's strength in supported languages and character font sets, flexible user interface, data entry, processing power, and user experience in content management.

27 Claims, 8 Drawing Sheets

(56) References Cited

U.S. PATENT DOCUMENTS

| | | |
|---|---|---|
| 2002/0188948 A1 | 12/2002 | Florence |
| 2004/0100975 A1* | 5/2004 | Kreiner et al. ................ 370/401 |
| 2004/0172388 A1 | 9/2004 | Newton et al. |
| 2005/0193015 A1* | 9/2005 | Logston et al. ............ 707/104.1 |
| 2006/0047750 A1* | 3/2006 | Schmitt et al. ................ 709/204 |
| 2006/0075433 A1* | 4/2006 | Gardes ............................ 725/48 |
| 2006/0242259 A1* | 10/2006 | Vallabh et al. ................ 709/217 |
| 2008/0083000 A1* | 4/2008 | Orrell et al. ..................... 725/53 |
| 2008/0120649 A1* | 5/2008 | Seo .................................. 725/39 |
| 2008/0163049 A1* | 7/2008 | Krampf ......................... 715/700 |
| 2008/0311889 A1* | 12/2008 | Dunko et al. .............. 455/414.1 |
| 2009/0030931 A1* | 1/2009 | Khivesara et al. ............ 707/102 |
| 2009/0088143 A1* | 4/2009 | Kim et al. ...................... 455/418 |
| 2009/0202079 A1* | 8/2009 | Puputti et al. ................. 380/279 |
| 2009/0222117 A1* | 9/2009 | Kaplan et al. .................... 700/94 |
| 2010/0082681 A1 | 4/2010 | Adimatyam et al. |
| 2011/0034121 A1* | 2/2011 | Ng et al. ...................... 455/3.06 |
| 2011/0078731 A1* | 3/2011 | Nishimura ...................... 725/39 |
| 2011/0126239 A1* | 5/2011 | Lee et al. ........................ 725/50 |
| 2011/0167132 A1* | 7/2011 | Kazerouni et al. ............ 709/217 |
| 2011/0302610 A1* | 12/2011 | Karaoguz et al. ............... 725/46 |
| 2012/0060089 A1* | 3/2012 | Heo et al. ...................... 715/702 |
| 2012/0062793 A1* | 3/2012 | Vanderhoff .................... 348/514 |
| 2013/0067387 A1* | 3/2013 | Kim et al. ..................... 715/780 |

\* cited by examiner

PERSONALIZED SECOND DISPLAY BROWSING EXPERIENCE DUE TO MULTIPLE SESSION FEATURE

CROSS-REFERENCE TO RELATED APPLICATIONS

This application claims benefit of priority of U.S. Provisional Patent Application Ser. No. 61/441,866, filed Feb. 11, 2011, entitled "PERSONALIZED SECOND DISPLAY BROWSING EXPERIENCE DUE TO MULTIPLE SESSION FEATURE", owned by the assignee of the present application and herein incorporated by reference in its entirety.

BACKGROUND

Internet delivery of digital content to IPTVs continues to increase, giving rise to an equally challenging issue of content navigation and management. Because of the IPTV's unique situation of being a shared device that is controlled by a simple input device, it is difficult to find an ingenious solution that will resolve this issue without excessively raising hardware costs, especially for disparate users. It is impractical to make a remote controller for all possible functions, because the same will significantly increase costs. It is also difficult to navigate around a large IPTV screen, searching for content, without disturbing the viewing experience of other users. Consequently, issues of cumbersome data entry, limitations in memory and processing power, difficulties in effective content searches and the traditional, but limited, one-to-one interaction with the IPTV remain as major obstacles.

In addition, the current IPTV experience is one of uniformity in terms of functionality and looks. This consistency is good across devices so that a single user does not have to adapt to different user interface (UI) experiences for different devices. However, the same does not provide significant variety for a user.

SUMMARY

Systems and methods according to the principles described here provide a way for users to browse services, content items, or the like using a particular and personalized browsing style or theme. In this way, even for different users who use the same IPTV, which is typical of a household, these users may be enabled to browse and choose content items in their own style or theme. A user who enjoys technology and gadgets may prefer a more intriguing UI, while a user less interested in such pursuits may prefer a more simple and direct UI.

The personalized style may include such aspects as language, rating, favorites, UI layout and background, and so on. A personalized theme may include aspects such as seasons within the year, a favorite hero or movie, cartoons, sports settings, or the like. Each theme may then employ its own elements such as font type, size, arrangement, layout, language, etc. Within a theme, elements may be moved around to suit the user's taste, re-arranged, or removed. Themes may be employed, e.g., for the visually impaired, allowing these users to have elements that are most useful to them, including fonts, characters, etc. In some cases, a theme may support 3D, so that a 2D display device that supports 3D viewing, with or without glasses, may be used to browse and navigate in the 3D theme template UI.

Using the method to create authentic multiple sessions for a single IPTV device, multiple users can browse services and content items at the same time, while personalizing each individual browsing experience. Generally, users may send these selected content items to the IPTV for playback.

One form of personalization includes personalized language and background settings. In this way, each individual user can browse services and content items in their own native tongue. Besides convenience, another advantage to this aspect is that the second display is likely to support languages which the IPTV does not. In this way, the system and method add value to the IPTV experience without adding costs. Other forms of personalization include a personal list of favorites (services or assets) and a personal browsing history. In addition, each user may choose their own UI background, or even UI layout if more than one UI layout option is available.

In one implementation, the following steps are performed. A user may load an application, such as a web application, on a second display. Using the systems and methods described, the user may then browse various services, such as may be provided on a management server, on the same session as the IPTV. The user may then navigate to a settings page of the second display and select different IPTV settings, e.g., language, background, rating, parental block, etc. The settings of the second display application change accordingly. For language, the language of the web application changes. Interaction with service providers may also include the settings changes so that lists of services or content are returned using the altered settings if available. The appearance of the second display application can also be changed. For example, the background could be set to a different color or background wallpaper of the user's choice. The UI layout can also change according to the user's preference if alternatives are available. For example, the UI layout may include a scrolling list where the assets list is presented in a list form. Alternatively, assets thumbnails may be presented in a grid. Other forms of UI are also possible.

Variations of the above system and method will also be seen. For example, the personalization may extend to the ratings of content used as a filter on individual second displays. For example, a user's cell phone may have an associated rating pertaining to what content is allowed to be played back thereon. In the same way, a television in a children's room may have a much lower rating used as a filter (e.g., so less content is available). When a child is changing the channels in such a system, the TV would automatically skip over channels that do not meet the ratings criterion. A user account may have associated therewith a number of user profiles, and the personalization information may be stored per profile. In other cases, the user account is the same as a user profile, especially where just one user is on the account.

Personalization information may be stored on the second display, as a cookie or otherwise, or alternatively at a management server. In some cases, one or the other will be preferred. For example, information about the template for given device may generally be stored on the server side, while information, e.g., about icon size, may be stored at the client side.

The disclosed systems and methods provide a way for a group of users to exploit individual "second displays" to view, browse, and navigate content or data service offerings, by service providers, e.g., internet network services, in a personalized way, simultaneously, especially in ways not supported by a content playback device.

Where multiple content playback devices are provided, an individual content playback device may be selected from those available for content playback. Content offerings (services or assets) may then be customized to that device upon playback.

The second displays provide complementary functionality to the IPTV, but generally do not require additional investment by the user because the same make use of a device, e.g., a smartphone, laptop computer, tablet computer, an internet appliance, a desktop computer, etc., which most users would already have in their possession. Such a second display is a significant complement to an IPTV because of the second display's strength and flexibility of user interface, supported languages and character font sets, data entry, processing power, and user experience in content management.

Multiple users using the system and method are enabled to use their personal devices like laptops, tablets, and smartphones to browse and search for content in a personalized way, e.g., on content servers operated by service providers, to manage such content and the presentation of authentication credentials therefore, to perform transactions, and to personalize their browsing and searching experience without disturbing the screen of the content playback device and viewing experience of other viewers. Communications with content servers may take place through a proxy server, and the proxy server presents to service providers the authentication credentials of the content playback device, so that the second displays appear to the service providers as authenticated content playback devices. Playback of proprietary content may be arranged to be prohibited on the non-authenticated device, e.g., the second display, so that security risks are minimized (although exceptions to this are described below). The application running on the second display may be a web application (scripting or non-scripting), a native application, a Java application, or any other sort of application that may work with a content playback device. For example, the ASP/.NET framework with RPC can be employed to write the second display application. Where the web application running on the second display is written in HTML or HTML with Javascript, the same may be loaded by any device with a browser, and so the same is not limited to only a small set of compatible devices or expensive remote controls.

The second displays may include any device that can run a web application, including, but not limited to, personal computers, laptop computers, notebook computers, netbook computers, handheld computers, personal digital assistants, mobile phones, smart phones, tablet computers, hand-held gaming devices, gaming consoles, and also on devices specifically designed for these purposes, in which case the special device would include at least a processor and sufficient resources and networking capability to run the web application.

The content playback device can take many forms, and multiple content playback devices can be coupled to and selected within a given local network. Exemplary content playback devices may include IPTVs, DTVs, digital audio systems, or more traditional video and audio systems that have been appropriately configured for connectivity. In video systems, the content playback device includes a processor controlling a video display to render content thereon.

In a general method, a user employing a second display has a user account with a source or clearinghouse of services. Here, the source or clearinghouse is represented as a user account on a management server, but it should be understood that the user account may be with a service provider directly. In any event, this account has information stored thereon related to what content playback devices are associated with the account. When a user logs on, they may see this list of content playback devices and may choose a particular content playback device. If there is only one content playback device on the network, or if the user is browsing in a way that the content playback device identity is not needed, then this step may be omitted.

Besides appearing as associated with a user account, content playback devices may be discoverable and controllable, e.g., via infrared or Bluetooth® or otherwise, that are not part of the user account with a management server or with a service provider. It may even be possible for a user to playback content on such a content playback device, if a service provider has made available content that can be delivered without access made to a user account.

Once a content playback device has been chosen, a list of services may be displayed (if more than one is available). The list of services may be customized to those that have content playable on the chosen content playback device, or all available content may be displayed, in which case, in certain implementations, a notation may be displayed adjacent the content item as to whether it is playable on the selected device. Where no content playback device has been selected, all available content may be displayed. If no content playback device has been selected, but the user account includes stored information about which content playback devices are available, then all content may be displayed, a subset of all content may be displayed based on the known content playback devices, or notations may be presented about which content playback devices can play which content, or a combination of these. In some cases, a content service provider may require a content playback device to be chosen. In other cases, no content playback device need be chosen and the user may simply choose and queue content for later playback by a content playback device to-be-determined at a later time.

Assuming multiple services are available, the user then selects a service to browse. The service presents a list of available content items as noted above. The presentation may be in any number of forms, including by category, or in any other form of organization. The proxy server presents an authentication credential of the content playback device to the content server. In some cases, service provider credentials for accessing the various services may be stored in the account, and presented by the proxy server or management server to the content server when needed.

Individual services may employ their own DRM schemes which the current system may then incorporate. For example, if a video content service provider only allows a certain pre-determined number of devices on which their content may be played back, then this rule will be enforced or duplicated within the current system and method. Moreover, changes to such service provider parameters may be periodically polled for by the proxy server and/or management server, or the same may be polled for at the next login of the service. In other words, upon login, the system and method may poll for and receive a token associated with the given service provider, the token providing information to the system about the user account with the content service provider.

The system and method may include a management server which, along with the content playback device, communicates with at least one content server such that the content server provides content items for presentation or access of the content item at the content playback device. The system and method may further include a proxy server communicating with the management server and the second displays. In some cases, the proxy server may be merged with the management server, or in other cases a separate proxy server may be provided for each content server or service provider.

In another aspect, a proxy server includes at least one processor and at least one network interface communicating with the processor to establish communication between the processor and a wide area network. At least one computer-readable storage medium is accessible to the processor and bears logic causing the processor to receive login information from a second display. Responsive to a determination that the login information is correct, the server sends to the second display a local IP address of the content playback device associated with the login information. The proxy server receives from the second display information about the content playback device requesting a list of services available to the content playback device from at least one content server of a service provider and sends a request for the list of services to a management server. The proxy server receives from the management server the list and sends it to the second display for presentation of information on a video display thereof. The proxy server receives from the second display a request for a content item and, responsive to the request of the content item, requests a service login of the content server. The proxy server receives back from the content server a list of items, assets, categories or services and sends the list to the second display. In this way, the list can be presented on a video display of the second display so that a user can navigate to enter a selection to command the content playback device to play the selection.

In one aspect, the invention is directed to a method of arranging a browsing session for content items for playback on a content playback device. The method includes steps of establishing a user account session between a second display and a server, the second display further in communication with at least one content playback device, where the establishing a session between a second display and a server includes downloading an application from the server to the second display. The application is configured to display: text in a first language and character font set associated with a user profile or with the content playback device or with a default value; a background image associated with a profile or with a default value; a background layout associated with a profile or with a default value; a parental block rating level associated with a profile or with a default value; a listing of favorite content items or services associated with a profile; or a listing of content items or services in a browsing history associated with a profile. A next step is that an input is received from a user, the input indicating a user selection of: a second language, the second language having a corresponding character font set; a second background image; a second background layout; or a second parental block rating level. The user interface of the application is then changed, or a signal is sent to change the user interface of the application, according to the selection, or, if the selection is not available, then the user interface is changed, or a signal is sent to change the user interface of the application, according to a default value of the selection, the default value of the selection associated with a service provider, the content playback device, the second display, or the server.

Implementations of the method may include one or more of the following. The method may further comprise receiving an input from a user, the input indicating a user selection of a content item from a service provider; and causing the content playback device to request the content item from the service provider, where the content playback device requests the content item using an authentication credential. The method may further include displaying a list of content items on the second display, and where the list is displayed according to the selection, and where the items on the list are generated at least in part using a device characteristic of the content playback device. The method may further include displaying a list of content items on the second display, where the list is displayed according to the selection, and where the items on the list are generated at least in part using a list of content playback devices associated with the user account or using a list of content playback devices discovered by the second display. The items on the list may be generated at least in part using a list of service providers associated with the user account. The method may further include displaying a list of content playback devices associated with the user account or discovered by the second display, where the list is displayed according to the selection, and may further include receiving a selection of which content playback device is to play back a selected content item. The causing the content playback device to request the content item may include causing the second display on which the selection was received to communicate the selection to the content playback device, for the content playback device to request the content item. The causing the content playback device to request the content item may include causing the second display on which the selection was received to communicate the selection to a proxy server on behalf of the content playback device. The receiving an input from a user, the input indicating a user selection, may include receiving data from a user profile. The changing the user interface of the application may include changing the text to a second language and character font set or to a default language and character font set and the changing the text may include translating the text. The application may be a web application or an application written in native code.

In another aspect, the invention is directed to a non-transitory computer-readable medium, comprising instructions for causing a computing device to implement the above method.

In yet another aspect, the invention is directed to a computer program, stored on a non-transitory computer-readable medium, for causing a second display to perform the following steps, the second display associated with at least one content playback device. Steps include establishing a session between a second display and a server, the session associated with a user account on the server, including: receiving data about at least one content playback device associated with the user account or receiving data about at least one content playback device discovered by the second display; receiving an application from the server; and executing the application, the application configured to display: text in a first language and character font set associated with a user profile or with the content playback device or with a default value; a background image associated with a profile or with a default value; a background layout associated with a profile or with a default value; a parental block rating level associated with a profile or with a default value; a listing of favorite content items or services associated with a profile; or a listing of content items or services in a browsing history associated with a profile. A next step includes receiving an input from a user, the input indicating a user selection of: a second language with a corresponding character font set, a second background image, a second background layout, or a second parental block rating level. A next step includes changing the user interface of the application according to the selection, or, if the selection is not available, then changing the user interface of the application according to a default value of the selection, the default value of the selection associated with the second display.

Implementations of the program may include one or more of the following. The second display may be further caused to perform one or more of the following additional steps: receiving a list of available content items from the proxy server and displaying the list according to the selection; receiving a selection of one or more of the available content items; and transmitting one or more reference identifiers identifying the one or more respective content items to the proxy server, such that the one or more reference identifiers are configured to be employed at a proxy server with an authentication credential of the content playback device to request from one or more respective service providers that the one or more content items be made accessible for playback on the content playback device. A plurality of second displays may be associated with the at least one content playback device, and each second display of the plurality may be configured to render a user interface according to a respective selection. The step of receiving data about at least one content playback device associated with the user account may include: receiving a selection from a user of one or a set of content playback devices associated with the user account, receiving data about a default content playback device, receiving data about a discovered content playback device, or receiving stored data about previously-used content playback devices. The second display may be selected from the group consisting of: a laptop computer, a tablet computer, a desktop computer, an internet appliance, and a smart phone. The program may provide that the second display receives a list of available service providers. The step of transmitting one or more reference identifiers identifying the one or more respective content items to the proxy server may include transmitting the reference identifiers directly to the content playback device where the content playback device transmits a request to a service provider using its authentication credential for the identified content items. The transmitting directly may include transmitting using a transmission scheme including: wired transmissions, wireless transmissions, infrared transmissions, Bluetooth® transmissions, or over a local network. The step of transmitting one or more reference identifiers identifying the one or more respective content items to the server may include transmitting the reference identifiers to a proxy server on behalf of the content playback device. The step of receiving an input from a user, the input indicating a user selection, may include receiving data from a user profile. The changing the user interface of the application may include changing the text to a second language and character font set or to a default language and character font set and the changing the text may include translating the text.

In yet another aspect, the invention is directed to a computer program, stored on a non-transitory computer-readable medium, for causing a server to perform the following steps: receive a request to establish a session with a second display, and upon proper user authentication establish a session with the second display, the session associated with a user account; receive data about at least one content playback device associated with the user account; transmit to the second display an application, the application allowing the second display to browse content offerings of a service provider using the server, the application configured to display: text in a first language and character font set associated with a user profile or with the content playback device or with a default value; a background image associated with a profile or with a default value; a background layout associated with a profile or with a default value; a parental block rating level associated with a profile or with a default value; a listing of favorite content items or services associated with a profile; or a listing of content items or services in a browsing history associated with a profile. Additional steps include receiving an input from a user, the input indicating a user selection of: a second language, the second language having a corresponding character font set; a second background image; a second background layout; or a second listing of content items appropriate to a rating level. Additional steps include transmitting a signal to change the user interface of the application according to the selection, or, if the selection is not available, then changing the user interface of the application according to a default value of the selection, the default value of the selection associated with the server or with a service provider.

Implementations of the invention may include one or more of the following. The second display may be further caused to perform the following additional steps: transmitting to the second display a list of available content items, the second display displaying the list of available content items using the selection or a default value of the selection; receiving from the second display a selection of one or more content items for playback; and transmitting to the service provider a request for the one or more content items to be made available for playback on the content playback device, the request including an authentication credential of the content playback device. The step of receiving data about at least one content playback device associated with the user account may include: receiving a selection from a user of one or a set of content playback devices associated with the user account, receiving data about a default content playback device, receiving data about a discovered content playback device, or receiving stored data about previously-used content playback devices. The server may be further caused to perform the steps of: transmitting to the second display a list of available service providers; receiving from the second display a selection of a first content item from one of the service providers; placing the first content item in a queue; receiving from the second display a selection of a second content item from another of the service providers; placing the second content item in a queue; and upon playback of each queued content item, providing to the respective service provider a service provider credential, the service provider credential associated with the user account and with the selected service provider. The transmitted list may be customized based on at least data about the content playback device. The receiving an input from a second display, the input indicating a user selection, may include determining if a selection has been previously indicated by polling a user profile. The transmitting a signal to change the user interface of the application may include changing the text to a second language and character font set or to a default language and character font set, and the changing the text may include translating the text.

Advantages of certain embodiments of the invention may include one or more of the following. Use of a second display affords significant additional features over the case of browsing solely on an IPTV, e.g., browsing may be performed in a highly personalized way. The system and method are not tied to any particular technology—generally, any appropriately-configured second display may be employed to control any appropriately-configured content playback device, and such second displays generally provide significantly significantly greater flexibility in user interface, providing a superior user experience in browsing service providers. For example, a user can search for content items in their own language, e.g., typing in characters that are not supported on their IPTV. The system may employ on-device service affiliations for premium services such as are available for watching video or other online content, employing the authentication credentials of the IPTV to access premium content while still allowing safe access for browsing by a second display. These service affiliations can include information about a user's preferences for browsing, or the same may be stored in a general user profile, e.g., on a management server, or as associated with a number of such service affiliations. The user preferences may be employed to inform the user interface of the second display when browsing the service.

Other advantages will be apparent from the description that follows, including the figures and claims.

BRIEF DESCRIPTION OF THE DRAWINGS

Like reference numerals denote like elements throughout.

DETAILED DESCRIPTION

Figure 1:
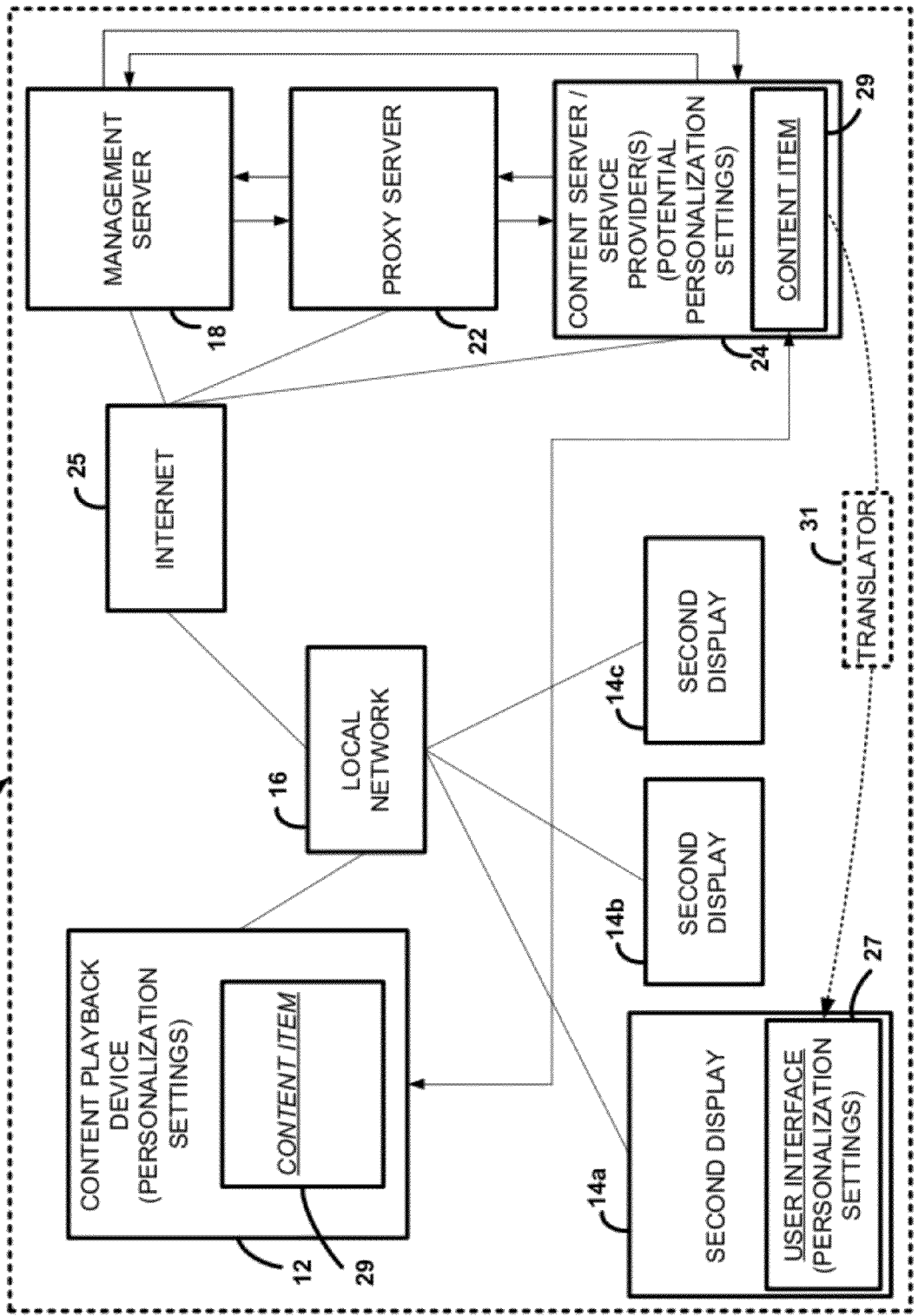
FIG. 1 is a block diagram of an exemplary system in accordance with the present principles.

Referring initially to FIG. 1, a system 10 is shown including a content playback device 12 coupled to a local network 16, which may be wired, wireless, or a combination of both. Also coupled to the local network 16 are one or more second displays 14a-14c, an exemplary one of which is termed herein second display 14i. A number of servers may be accessed by the content playback device 12 and the second display 14i through the local network 16 and the internet 25, including a management server 18, a proxy server 22, and one or more content servers 24.

When the second display 14i browses service providers, content offerings, or the like, e.g., information about a content item at service provider 24, it may do so using personalization settings chosen by the user, e.g., a personalized language, personalized content choices according to rating, a personalized list of favorite services for content items, a personalized background or layout for a user interface, or the like. Such items are generally portrayed on a user interface 27 of the second display 14a. For example, a sophisticated user may prefer a detailed UI, with numerous settings that may be adjusted for every aspect of their viewing, browsing, and content selection. On the other hand, other users may prefer a simpler UI, with a limited number of choices, that is easy and convenient to use. Using a control device such as the disclosed second display, an extremely wide range of options may be made available to users for just such personalization. In this way, the user interface and browsing experience appears in a desired fashion on second display 14i.

In some cases, the personalization settings relate to language and a character font set. Particular aspects of language and character font set personalization are noted in co-pending U.S. patent application Ser. No. 12/982,483, filed Dec. 30, 2010, entitled "SECOND DISPLAY SUPPORT OF CHARACTER SET UNSUPPORTED ON PLAYBACK DEVICE", assigned to the assignee of the current invention and herein incorporated by reference in its entirety. Here it is noted that the personalization settings may include support of desired languages and character font sets, and in this regard a translator 31 may be provided to automatically translate pages or portions of pages from service provider 24 and provide translated versions of the same to the user interface 27 of the second display 14a. The translator 31 may be a module disposed within the local network, within the second display, on the content, management, or proxy server, or at any other accessible location on the internet. Even in cases where the translator 31 returns a translation with errors, the same may be very helpful to a user in browsing service providers and content offerings.

The content playback device 12 may be, e.g., an IPTV, a digital TV, a digital sound system, a digital entertainment system, a digital video recorder, a video disc player, a combination of these, or any number of other electronic devices addressable by a user on the local network 16. For the sake of simplicity, in this specification, the content playback device 12 will occasionally be exemplified by an IPTV, in which case it will generally include a processor that controls a visual display and an audio renderer such as a sound processor and one or more speakers. The processor may access one or more computer-readable storage media such as but not limited to RAM-based storage, e.g., a chip implementing dynamic random access memory (DRAM), flash memory, or disk-based storage. Software code implementing present logic executable by the content playback device 12 may also be stored on one of the memories shown below to undertake present principles. The processor can receive user input signals from various input devices including a remote control device, a point-and-click device such as a mouse, a keypad, etc. A TV tuner may be provided in some implementations, particularly when the content playback device 12 is embodied by an IPTV, to receive TV signals from a source such as a set-top box, satellite receiver, cable head end, terrestrial TV signal antenna, etc. Signals from the tuner are then sent to the processor for presentation on the display and sound system. A network interface such as a wired or wireless modem communicates with the processor to provide connectivity to the Internet through the local network 16. It will be understood that communications between the content playback device 12 and the internet, or between the second display 14i and the internet, may also take place through means besides the local network 16. For example, the second display 14i may communicate with the content playback device 12 through a separate mobile network.

One or more second displays 14a-14c are provided that each bear a processor and components necessary to operate a web application, e.g., a browser application. In particular, the processor in the second display may access one or more computer-readable storage media such as but not limited to RAM-based storage, e.g., a chip implementing dynamic random access memory (DRAM), flash memory, or disk-based storage. Software code implementing present logic executable by the second display may also be stored on one of the memories described below to undertake present principles. Further, the second display 14i can receive user input signals from various input devices including a point-and-click device such as a mouse, a keypad, a touchscreen, a remote control, etc. A network interface such as a wired or wireless modem communicates with the processor to provide connectivity to wide area networks such as the Internet as noted above.

The servers 18, 22, and 24 have respective processors accessing respective non-transitory computer-readable storage media which may be, without limitation, disk-based and/or solid state storage. The servers communicate with a wide area network such as the Internet via respective network interfaces. The proxy server 22 may in some cases be combined with the management server 18, although in many cases it may be preferable to separate the servers to better accommodate server load. The servers may mutually communicate via the internet 25. In some implementations, the servers may be located on the same local network, in which case they may communicate with each other through the local network without accessing the internet. For example, in one exemplary implementation, the management server 18 and the proxy server 22 may be disposed in the same data center, so communication between the two may stay within the data center.

While an exemplary method of the system is described below, certain method steps especially pertinent to certain arrangements of the second display will be described here.

Responsive to the second display 14i sending a request to the proxy server 22 for an executable utility, the proxy server 22 returns the utility to each second display 14i. Running the utility causes the instantiation of an application. The implementation discussed here will include a web application, but it will be understood that other types of applications may also be employed. The second display 14i, executing the web application, prompts a user to input to each second display 14i login information. The login information may be common or may differ between second displays. The proxy server 22, responsive to reception of correct login information from the content playback device 12, returns the local IP address of the content playback device 12 to the second display 14i, because the same has previously been registered to a user account in which such information is maintained. The proxy server 22 may also return a list of content playback devices on the local network, responsive to which the second display 14i may select one for content playback. In turn, each second display 14i uses the local content playback device address to access the content playback device 12 directly to request information about the content playback device 12, which information is returned from the content playback device 12 to the second display 14i such that the local address of the content playback device 12 need not be globally addressable. Each second display 14i may also select content for playback on different content playback devices. The second display 14i sends the information about the content playback device 12 to the proxy server 22, requesting a list of services available to the content playback device 12 from one or more service providers. The services may be dependent on the device characteristics of the content playback device 12 chosen. For example, if the chosen content playback device 12 is an IPTV, video services may be returned. If the chosen content playback device 12 is an audio system, audio services may be returned.

The proxy server 22 relays the request for a list of services to the management server 18, which returns the list to the proxy server 22, with the proxy server 22 in turn sending the list to the second display 14i for presentation of information on the second display 14i. Responsive to a user selection of an item on the list, the second display 14i sends a request for service information corresponding to the selected content item to the proxy server 22. The proxy server 22 requests a service login of the content server 24 providing the content, and the content server 24 provides to the proxy server 22 a list of content items, assets, categories, or services, and the proxy server 22 relays the list to the second display 14i, which is presented on the second display 14i so that the user can navigate to enter a selection. The user may navigate and browse the offerings on the user interface of the second display, and this user interface may be personalized according to the principles described herein. Responsive to the selection, the second display 14i sends a command to the content playback device 12 to access and play back the selection.

The command to play the local content item may be in a number of forms. The second display 14i may communicate to the proxy server 22 the request on behalf of the content playback device 12, and this request may be via the local network or via other means. Alternatively, the second display 14i may transmit a request to the content playback device 12 that it itself formulate the request, and this transmission may be by way of the local network, the internet generally, or via other means such as other wired or wireless transmission schemes, including via USB, IR, Bluetooth®, or any other schemes. If the second display 14i is configured to address the content playback device 12 at a non-local level, e.g., at the server level, then the second display 14i may be physically located virtually anywhere and still be able to queue content or to command the content playback device 12 to play content. In this case, however, server load would increase over the case where the second display and content playback device communicated directly or over a local network.

Certain method steps of an arrangement of the content playback device are described here. Using a network interface, the content playback device 12 can communicate with a management server 18 on the Internet and with one or more content servers 24, also on the internet and communicating with the management server 18. The management server 18 receives and stores a local IP address of the content playback device 12. The content playback device 12 communicates with the management server 18 to arrange for content items from the content server 24, operated by a service provider, to be played back on the content playback device 12. In more detail, the content playback device 12 sends login information to the management server 18 which returns to the content playback device 12 a user token that must subsequently be presented by the content playback device 12 to the content server 24 to obtain content from the content server 24.

Figure 2:
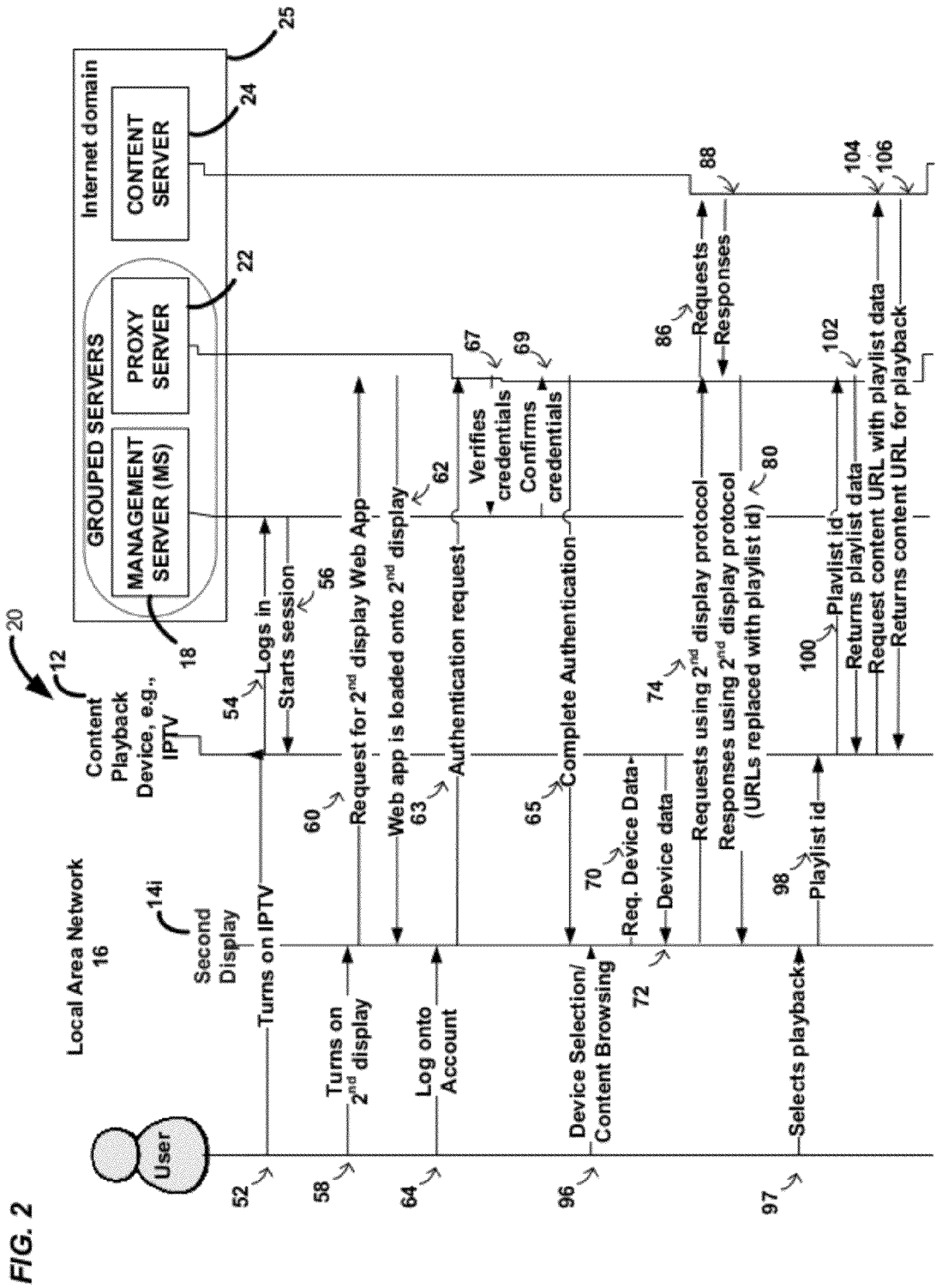
FIG. 2 is a sequence diagram illustrating the system and method according to the present principles.

FIG. 2 is a sequence diagram illustrating an exemplary implementation of the system and method for enabling a user to employ a second display to browse content playback devices, service providers, or content items and select the same for playback by a content playback device. FIG. 2 assumes that the user has already created an account with a management server and has affiliated one or more content playback devices with that account.

At state 52, a user turns on the content playback device 12. At state 54 the content playback device sends login information including, e.g., username and password, to the management server 18, which at state 56 returns to the content playback device a user token that may subsequently be presented by the content playback device to a content server 24 to obtain content from that server. The management server 18 in addition stores the local IP address of the content playback device 12.

At state 58, the user turns on the second display 14i and, e.g., instantiates a web browser session in which control may be exercised over the content playback device. A utility is executed on the second display 14i, at state 60, which sends a request to the proxy server 22, which returns in state 62 a web application, e.g., HTML with JavaScript, for the second display to execute for browsing content items. This application may make, e.g., asynchronous JavaScript and XML calls to the proxy server 22 and to the content playback device 12 to obtain information to control the content playback device 12.

With more specificity, at state 64, using the JavaScript received from the proxy server 22, the second display 14i prompts the user to input to the second display 14i the account login information, including, e.g., the same username and password that the content playback device provided to the management server 18 in state 54 during device registration. Of course, the account login information may differ as well. It will be appreciated that the servers 18, 22, and 24 communicate necessary account information between them as needed to realize the principles described here.

The proxy server 22 responds to a correct user name and password from the second display 14i in an authentication request state 63. The proxy server 22 verifies the user name and password with the management server 18 (states 67 and 69), creates and transmits a session token to the second display, obtains information about content playback devices affiliated with the user account, and completes the authentication in state 65. The proxy server 22 may return to each second display the information about all content playback devices 12 that are affiliated with the user account associated with the user name and password, including their local IP addresses which were stored by the management server 18 after login at 54 (and subsequently provided to the proxy server 22). In more detail, the proxy server 22 sends a token to the second display 14i, the token associated with a content playback device, and this token gets communicated in future transactions between the second display and the proxy server, so that the proxy server 22 knows what content playback device the content item is intended for. Each user with each second display may then choose a content playback device and browse the services and content options available through the services in state 96 and subsequent steps.

The proxy server and/or management server employ information stored with the user account to arrange the user interface of the second display according to the personalization settings of the user. If the user account has several user profiles associated with it, then the personalization settings of the user profile are employed. It is noted, however, that user interface information and generation may be stored and provided on the second display as well. For example, information about the template for given device may generally be stored on a server, while information, e.g., about icon size, may be stored at the client. The user interface may be instantiated appropriately upon startup of the second display application or upon receipt of a signal from the management server or proxy server. The signal from the management server or proxy server may be sent upon recognition and authentication of the second display during the login process. Besides from a user account or profile, personalization information may come from default settings or from the settings of the content playback device as noted below.

The second display 14i, using the local IP address returned as noted above, accesses the content playback device directly, in the sense of communicating through the local network. To select a particular content playback device, the second display 14i requests information about the content playback device 12 at state 70, including language information, digital rights management (DRM) information, etc., as desired, which information is returned from the content playback device to the second display 14i at state 72. Since the second display 14i knows the IP address of the content playback device 12 and consequently communicates directly with the content playback device 12, the second display 14i communicates using a local web address of the content playback device 12 that need not be globally addressable, and may so communicate as long as the second display 14i and content playback device 12 are on the same local network.

Each second display 14i may send the client information received at state 72 to the proxy server 22, requesting a list of services available to the content playback device 12, or that the content playback device 12 is entitled to, from one or more of the content servers 24. The proxy server 22 relays the request to the management server 18, which returns the requested service list to the proxy server 22. The proxy server 22 in turn sends the services list to the second display for presentation of available services on, e.g., a display of the second display. Each user browses the services and their content on the second display just as though it were the actual content playback device.

A user can input, using, e.g., a second display input device, a selection of a service on the list that was returned to the second display. In response, the second display, at state 74, sends a request for the corresponding service to the proxy server 22 along with the service token that that second display may have received from the content server 24 via the management server 18.

Responsive to the request, the proxy server 22 requests a service login at state 86 of the content server 24 providing the selected service. At state 88, the content server 24 provides to the proxy server 22 a list of content items, assets, categories or services, as the case may be, for the particular content server 24. If desired, the proxy server 22 may also request of the content server 24 a list of options, and the list may be returned in, e.g., extended markup language (XML) format to the proxy server 22 which relays the content items, assets, categories, services, etc. available for selection to the second display at the state 80. The relayed items are presented to the user of the second display using the chosen personalization settings as described above. The user may change the settings if desired at any point.

The content available for selection is presented on the second display so that the user can navigate in state 97 the display to enter a selection. Responsive to the selection, the second display at state 98 sends a command to the content playback device 12 to play the selection, and in particular sends a playlist id or reference identifier indicating the selection. At state 100, the content playback device 12, using its authentication credentials, sends the playlist id or reference identifier to the proxy server 22, which returns the required playlist data in state 102. The content playback device 12 can then request the content URL with the playlist data in state 104, which may be responded to with a return of the content URL for playback of the content item on the content playback device 12 in state 106.

Variations of the system and method are now described.

If the content playback device were already playing content, the new content commanded to be played by the second display may be placed in a queue in the content playback device and played when the current content completes. In any case, once the content has been commanded to be played, the user may continue to browse the second display for other content, to play or to add to the queue. Other users may employ their own second displays to do the same. A user may also desire to switch devices and resume playback on a different device by, e.g., navigating to a "recently viewed" list and selecting the last video played after switching control to the desired device.

The above description has been for the case where the proxy server 22 is employed to hide the content source, e.g., a content URL, from the second display 14i. That is, the proxy server 22 provides an API for the second display to use so that the content and/or content URL cannot be accessed directly, i.e., the details of the management server transactions to access the services remain desiredly unknown. In many cases, the second display 14i may have stored thereon little or nothing of the content playback device 12 details. In some cases, however, the URL may be directly provided from the proxy server 22 or the proxy server 22 may even be bypassed, e.g., in cases where the content item is intended for free distribution, e.g., movie trailers or the like. Similarly, while the above description has focused on content item playback on content playback device 12, certain content items, e.g., those which are intended for free distribution, may be played back on the second display 14i itself, if the same has been appropriately configured.

In the case where multiple second displays request content to be played at or near the same time, a simple rule such as the first-in-time may prevail. Alternatively, a priority scheme may be configured, such that certain second displays take precedence over other second displays.

Note further that the control device may command the content playback device to play content by sending to the content playback device over the local network commands coded as if they were sent from an infrared remote control, specifically for example the commands may be in the Sony Infrared Remote Control System (SIRCS) protocol.

Figure 3:
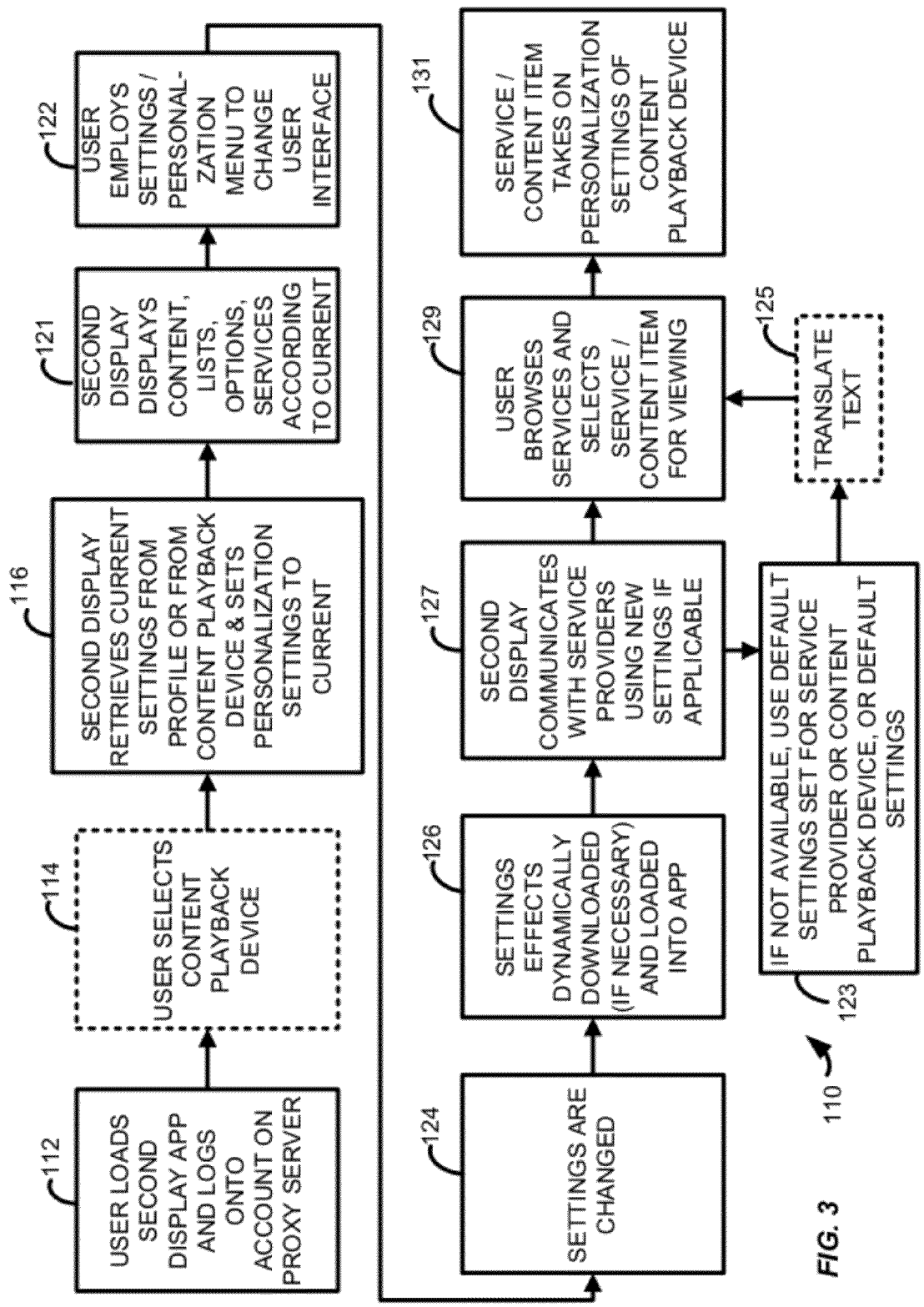
FIG. 3 is a flowchart illustrating an exemplary method according to the present principles.

FIG. 3 illustrates one exemplary method 110 by which personalization settings may be provided in the context of a second display to allow user browsing, searching, and content item selection to occur in a way personalized to a user. A first step in the method is that a user loads a second display application into their second display and logs on to a user account on, e.g., a proxy server (step 112). It will be understood that in some cases the user may log onto a management server.

A next step, which is optional, is that a user selects a content playback device (step 114). As described elsewhere, this step may be omitted where no content playback device is needed for browsing or where only one content playback device is affiliated with the user account. This step may also be omitted where such information is retrieved from a profile or via other methods described. Moreover, it is noted that it need not be the user account that provides information about content playback devices; rather, the same may be discovered by the second display during startup.

A next step is that the second display retrieves current settings from a profile or from a content playback device (or elsewhere, e.g., from a storage cookie on the browser) and sets the personalization settings according to those current settings (step 116). For example, the second display may retrieve and set settings including a current character font set and language, a parental block rating setting, e.g., a maximum rating, a list of favorites setting, a user interface background and/or layout setting, as desired by the user, from the profile. It is noted that in this sense a profile may include any memory or cache in which such data may be stored. The profile may also include not only preferred personalization settings but also a preferred personalization settings per service provider. Such information may be useful where, e.g., a user has more than one preferred language, but not all are supported by each service provider.

A next step is that on the second display various options are displayed using those current settings (step 121). For example, a list of service providers or a list of available content items within a service provider or across several service providers may be displayed. The display may vary with the personalization settings. For example, a UI layout may be a scrolling list we are the assets or services are presented in a list form. In an alternative layout, the assets or services may be thumbnails laid out on a grid. Other forms of UI are also possible.

A next step is that a user employs a menu or other such user interface, e.g., a settings menu, to change the personalization settings (step 122). The settings may then be changed to the user selection (step 124), and if necessary various files or utilities needed for the changed settings may be dynamically downloaded and loaded into the second display application (step 126). The user may then employ the second display to communicate with service providers using the new settings (step 127). If certain settings are not available for a given service provider, management server, or proxy server, default settings may be employed (step 123). The default settings may be set by the service provider, by the second display, by the servers, or even by the content playback device.

For example, in the case of a language and character font set, a dictionary of the web application may be switched to a new language and the character font set and new dictionary may be dynamically downloaded and loaded for use into the web application. The user may communicate with the service providers in the new language and using the new character font set, if the same is supported by the service providers. For example, if the new character font set and language are Chinese, the user may directly type in Chinese characters in a search for movies or the like in a Chinese video content service or in a Chinese version of a video content service. If the new character font set is not available, then communications will occur using a default character font set for the service provider. However, as noted with element 31 of FIG. 1, a step may be employed in some systems of translating the text prior to display (step 125). In this step, an automatic translation may be performed of the text to be displayed prior to its rendering on the second display.

A user may then browse the available services and content items and select a content item for viewing (step 129). Of course, due to the limitations of the content playback device, the chosen content item or asset, when played back, adopts a set of supported personalization settings of the content playback device (step 131), which may, e.g., incorporate a different character font set and language.

Aspects of various components are described below.

Figure 4:
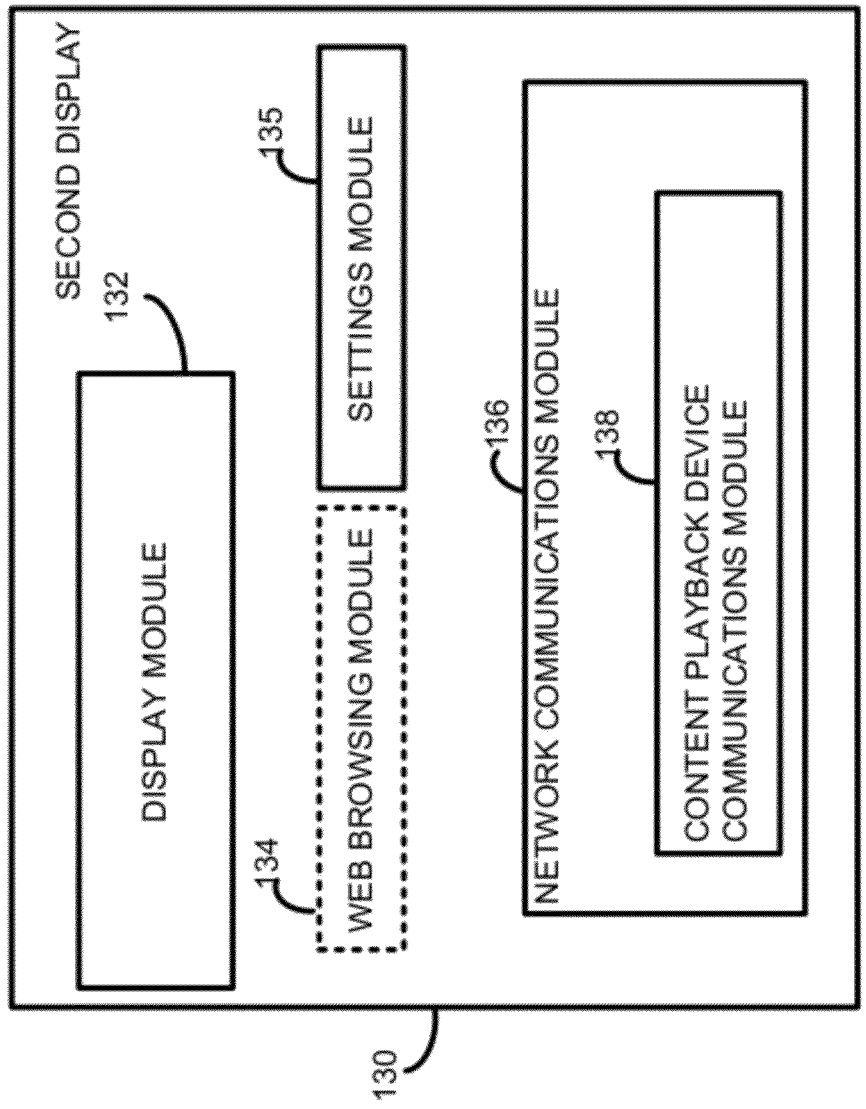
FIG. 4 is a block diagram of an exemplary second display system in accordance with the present principles.

FIG. 4 illustrates one implementation of a second display 130. The second display 130 includes a display module 132 for use in, among other aspects, browsing lists and selecting items related to the content playback device. For example, a list of content playback devices accessible to the local network and/or addressable by the second display may be displayed using the display module 132, and the user may choose a content playback device from among them. In addition to choosing a content playback device, or instead of, a user may review a list of accessible service providers using the display module 132. For example, such service providers may include those offering video-on-demand services for movies and other video content, or any number of other sites on which media and content may be browsed and selected. In one implementation, where a content playback device has been chosen, the results may be filtered based on the capability of the device to render the content. In another implementation, the display module 132 may display not just content accessible to the local network, but also content resident on the local network, such as content stored on a digital video recorder or Blu-Ray® player.

It is also noted that the actual display could be external to the second display device itself. For example, in the case of a Blu-Ray® player being used as a second display device, the display module 132 may be a unit that produces an HDMI output signal, while the actual display will be done by the television that is connected to that HDMI output.

Also within the second display 130 is an optional web-browsing module 134, through which the above-noted content items may be browsed in the case where the second display application is written in HTML and Javascript. A web-browsing module implemented in such a way allows the same to be implemented across many platforms, allowing any number of types of second displays to be employed. In some cases, however, special applications, e.g., helper applications, may be employed to communicate with particular proprietary or non-web-based technologies. Where the second display application is non-web-based, and is written in, e.g., native code, the web-browsing module 134 may be replaced with a suitable other module allowing service and content selection or other such functionality.

The second display 130 also includes a module for network communications 136. The network communications module 136 allows the second display to communicate with the local network as well as, in some cases, specific devices directly. As part of the network communications module 136, a communications module 138 for communications with a content playback device is provided. The content playback device communications module 138 allows the second display to communicate with the content playback device either over the local network or directly. Such direct communications may include various types of wired or wireless transmission schemes, including Wi-Fi, USB, infrared, Bluetooth®, or the like.

The second display 130 may further include a settings module 135. The settings module 135 may be controlled by the settings menu and may be employed to set the desired personalization settings as displayed by the display module 132, and may further be employed to send a signal using the network communications module 136 to service providers to indicate a desired group of personalization settings in which, if available, the user would desire to communicate. The second display may also include the translator module 31 in some implementations (see FIG. 1).

It is noted that the above modules may be implemented in hardware, non-transitory software, or a combination of the above. Typically, the same will be implemented within the context of a laptop computer, a tablet computer, a smart phone, or the like.

Figure 5:
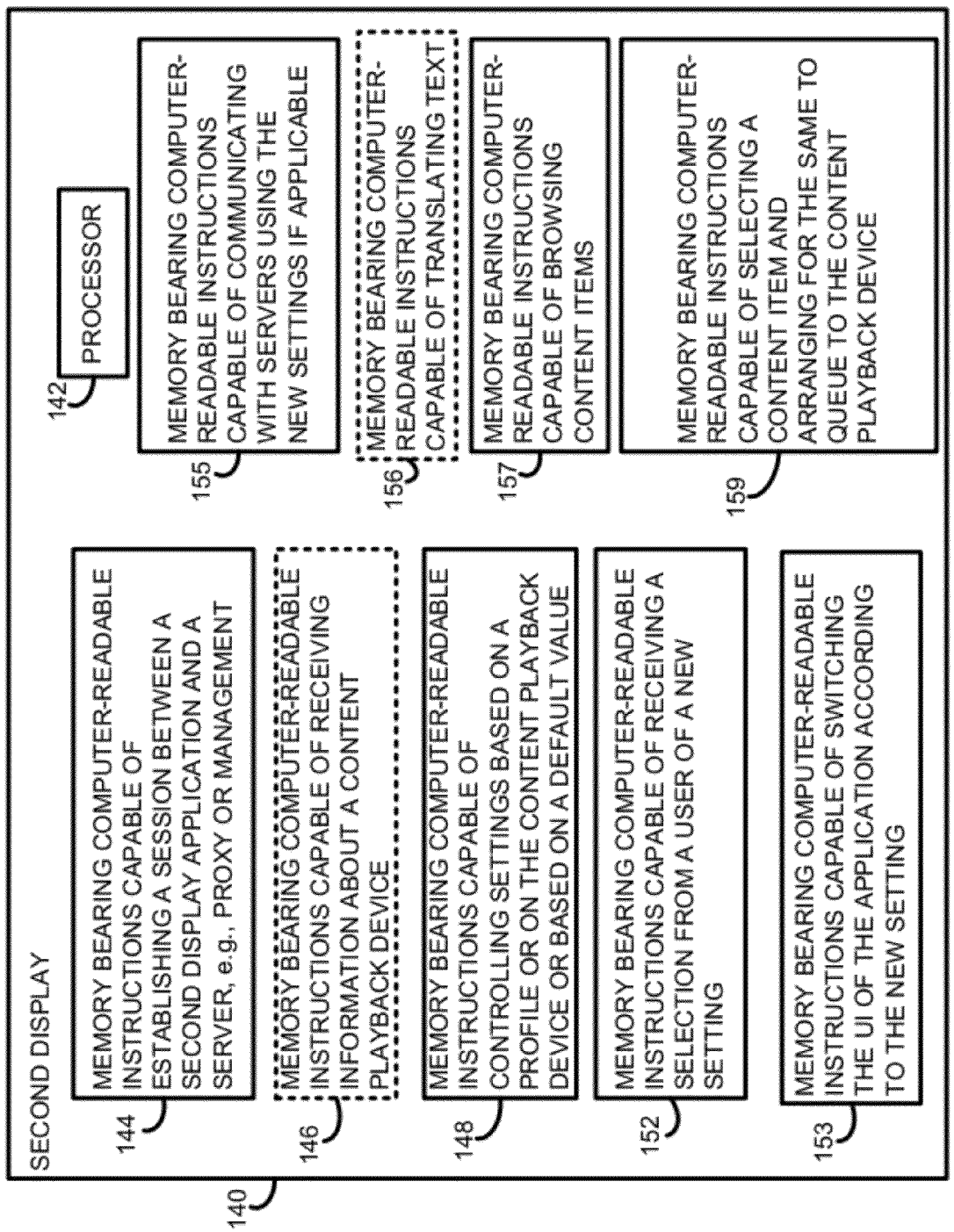
FIG. 5 is a block diagram of another exemplary second display system in accordance with the present principles.

Referring to FIG. 5, another implementation of a second display 140 is illustrated. In this implementation, the second display 140 includes a processor 142. The second display 140 further includes memory 144 bearing computer readable instructions capable of establishing a session between the second display and a server, e.g., a proxy or management server, via a local network. The second display 140 further includes memory 146 bearing computer readable instructions capable of receiving information about a content playback device. This step may be omitted in some implementations, but the same may advantageously allow the server to access certain service providers that require content playback device authentication and/or allow displayed lists of content items to be customized to the content playback device.

The second display 140 further includes memory 148 bearing computer readable instructions capable of controlling personalization settings based on a profile, on the content playback device, or on a default value of personalization settings. The second display 140 further includes memory 152 bearing computer readable instructions capable of receiving a selection from a user of a new personalization setting. The same may be provided in the form of a settings menu or other control in which the user may select a desired personalization setting. The second display 140 further includes memory 153 bearing computer readable instructions capable of altering the personalization settings of the second display application, e.g., to alter the user interface, according to the new setting or settings. The same may include downloading or accessing files or utilities in order to accomplish the altering. The second display 140 also includes memory 155 bearing computer readable instructions capable of communicating with servers, such as content service providers, using the new settings, if the service provider supports the new settings. The second display 140 may further include memory 156 bearing computer readable instructions capable of translating the text that is to be displayed on the second display. This memory is optional and may be situated in a number of locations in the system. The second display 140 further includes memory 157 bearing computer readable instructions capable of browsing or searching for content items, such as on a service provider. The second display 140 further includes memory 159 bearing computer readable instructions capable of selecting a content item so as to arrange for the content item to play in the content playback device or to be queued to play in the content playback device.

Figure 6:
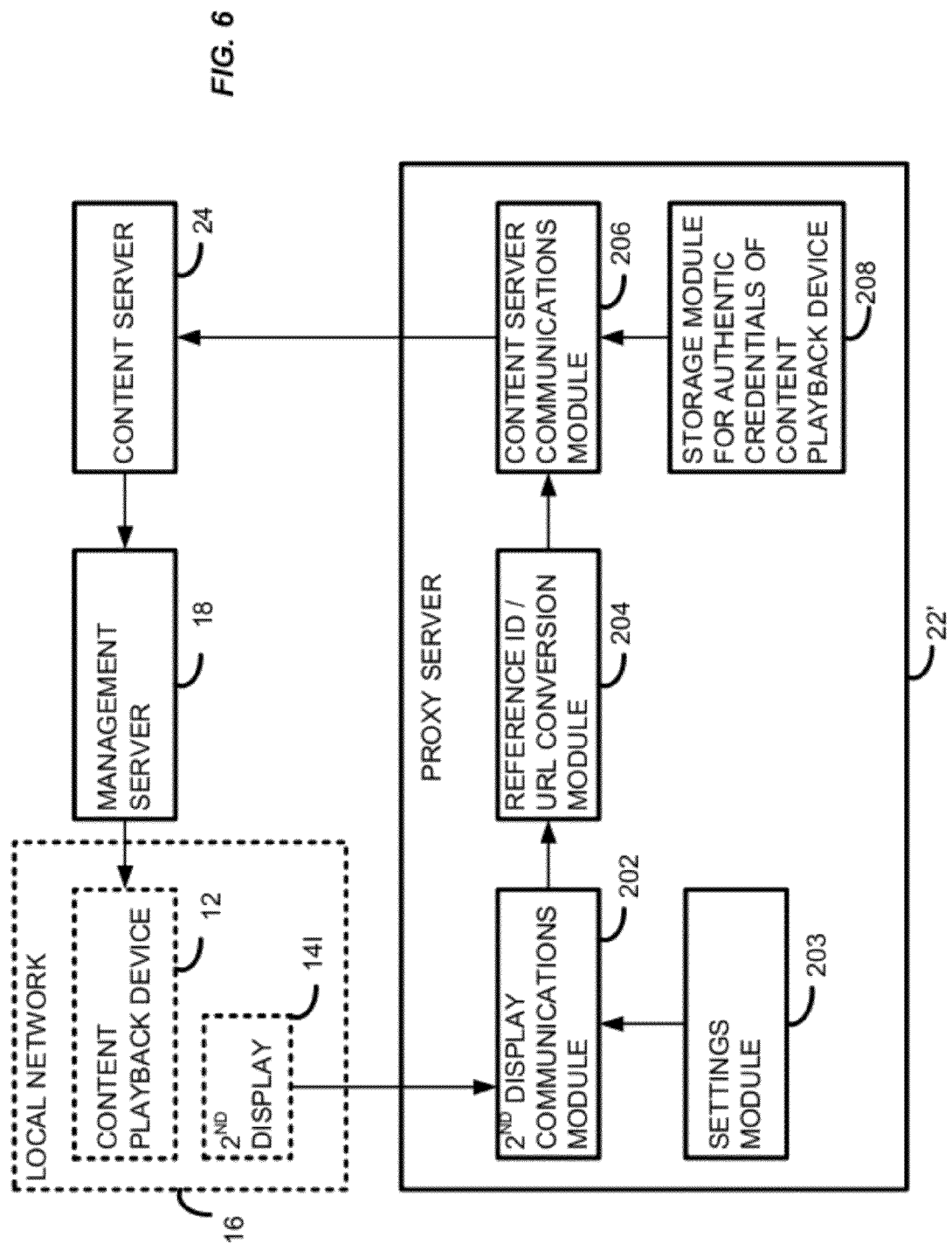
FIG. 6 is a block diagram of an exemplary proxy server in accordance with the present principles. It will be noted that in certain implementations a management server or content server may be organized in a similar fashion.

Referring to FIG. 6, details of a server are illustrated, such as an exemplary proxy server 22'. The proxy server 22' includes a second display communications module 202 which performs communications with the second display 14i, e.g., to provide lists of content playback devices, service providers, content items, and the like. In turn, the proxy server 22' receives from the second display 14i selections of service providers, content playback devices, and content items associated with service providers. The proxy server 22' further includes a storage module 208 which stores, among other things, authentication credentials of content playback devices associated with the user account. The proxy server 22' also includes a content server communications module 206 which communicates with content servers 24 and/or with management servers 18 to arrange for selected content playback devices 12 to receive selected content items, or access to the same, as chosen by a user using the second display 14i.

The proxy server 22' may further include a personalization settings module 203 that is responsive to the second display communications module 202. Responsive to a user changing a desired personalization setting, the personalization settings module 203 may cause any required or necessary files to be downloaded to or accessed by the second display 14i in order to accomplish the desired change. In some cases, these components may be already resident on the second display 14i, negating the need to download the same from a server. It is also noted that such files may be downloaded or accessed from locations besides the proxy server.

Finally, the proxy server 22' includes a reference ID/URL conversion module 204, which takes a playlist ID or reference identifier of the selected content item and converts the same to a content URL that may be employed by a service provider to arrange for a selected content item to be made accessible to a content playback device 12.

Figure 7:
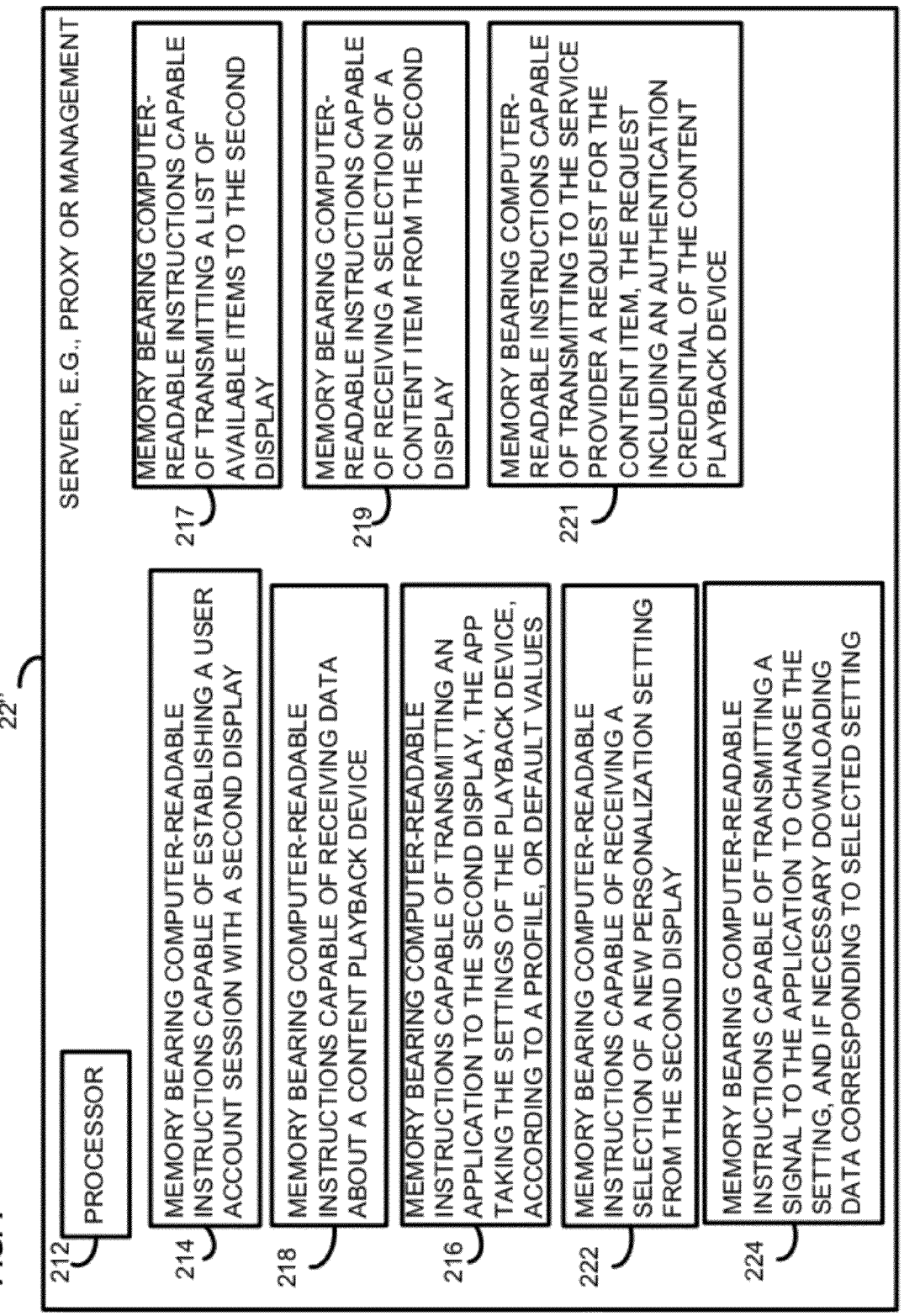
FIG. 7 is a block diagram of another exemplary proxy server in accordance with the present principles. It will be noted that in certain implementations a management server or content server may be organized in a similar fashion.

Referring to FIG. 7, another embodiment of a server 22" is illustrated, e.g., a proxy or management server. The server 22" includes a processor 212, which communicates with various memories to accomplish the principles described here. The server 22" includes memory 214 bearing computer readable instructions capable of establishing a user account session with a second display, and the user account may be associated with at least one content playback device. The server 22" further includes memory 218 bearing computer readable instructions capable of receiving data about a content playback device, e.g., one associated with the user account or otherwise accessible. The server 22" further includes memory 216 bearing computer readable instructions capable of transmitting an application, e.g., a web application, to the second display.

The second display application, when instantiated, operates according to various personalization settings. Startup values of the personalization settings may include default values stored in or associated with the second display, settings according to a user profile, default values associated with the user account, or default or preset values associated with a content playback device. The content playback device may be one selected by the user, one associated with the user account, one discovered by the second display, or a combination of these may be employed to inform the choice of personalization settings.

The server 22" further includes memory 222 bearing computer readable instructions capable of receiving a selection of a personalization setting from the second display. The server 22" further includes memory 224 bearing computer readable instructions capable of transmitting a signal to the application to change the personalization setting, and if necessary accessing or downloading files or utilities needed to implement the new personalization setting. The server 22" further includes memory 217 bearing computer readable instructions capable of transmitting a list of available items to the second display, e.g., services or assets. These items are displayed according to the new personalization settings.

The server 22" further includes memory 219 bearing computer readable instructions capable of receiving a selection of a content item from the second display. Finally, but without limitation, the server 22" includes memory 221 bearing computer readable instructions capable of transmitting a request to a content server for playback of the selected content item on the content playback device, the request employing an authentication credential of the content playback device. This request may be transmitted through, e.g., a management server. The playback of the content item on the content playback device occurs using the settings of the content playback device, e.g., a default character font set or one stored in a profile or other memory or cache associated with the content playback device.

Systems and methods have been disclosed that allow improvement of the user experience of the IPTV without adding to the hardware costs of the unit. As disclosed above, an application on a second display, e.g., a web application, may be used to browse network services using personalization settings such that the user interface is familiar to a user. The system allows for significant user convenience, allowing users to browse, search for, and select content items using the desired personalization settings, outside the confines of those typically available on content playback devices.

Figure 8:
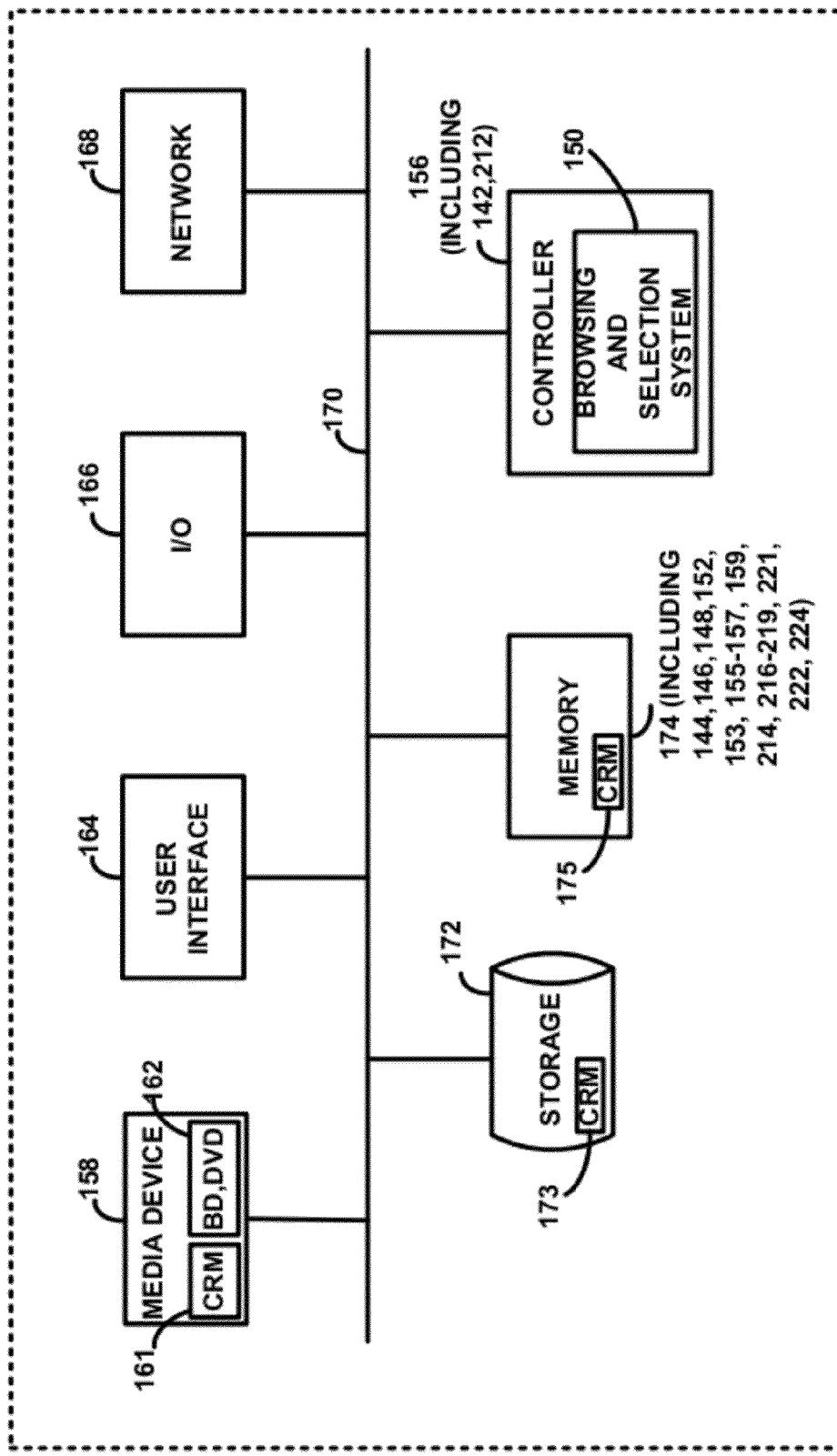
FIG. 8 illustrates an exemplary computing environment, e.g., that of the disclosed second display, proxy server, management server, or content server.

One implementation includes one or more programmable processors and corresponding computing system components to store and execute computer instructions, such as to execute the code that provides the second display or various server functionality, as well as for browsing. The second display functionality and various server functionality may be accomplished with such components. Referring to FIG. 8, a representation of an exemplary computing environment for a second display or server is illustrated.

The computing environment includes a controller 156, a memory 174, storage 172, a media device 158, a user interface 164, an input/output (I/O) interface 166, and a network interface 168. The components are interconnected by a common bus 170. Alternatively, different connection configurations can be used, such as a star pattern with the controller at the center.

The controller 156 includes a programmable processor and controls the operation of the computing environment and its components for a browsing and selection system with personalization settings 150. The controller 156 loads instructions from the memory 174 or an embedded controller memory (not shown) and executes these instructions to control the system. In its execution, the controller 156 may provide the functionality described above as, in part, a software system. Alternatively, the same may be implemented as separate modular components in the controller 156 or the second display 14i or servers.

Memory 174, which may include non-transitory computer-readable memory 175, stores data temporarily for use by the other components of the second display 14i, and the same may include memories 144, 146, 148, 152, 153, 155-157, 159, 214, 216-219, 221, 222, and 224 as discussed above. In one implementation, memory 174 is implemented as RAM. In other implementations, memory 174 also includes long-term or permanent memory, such as flash memory and/or ROM.

Storage 172, which may include non-transitory computer-readable memory 173, stores data temporarily or long-term for use by other components of the second display or servers, such as for storing data used by the system and controller. In one implementation, storage 172 is a hard disc drive or a solid state drive.

The media device 158, which may include non-transitory computer-readable memory 161, receives removable media and reads and/or writes data to the inserted media. In one implementation, the media device 158 is an optical disc drive or disc burner, e.g., a writable Blu-Ray® disc drive 162.

The user interface 164 includes components for accepting user input, e.g., the user content selections, from users and presenting information to the same, such as in the personalization settings described. In one implementation, the user interface 164 includes a keyboard, a mouse, audio speakers, and a display. The controller 156 uses input from the user to adjust the operation of the second display and servers.

The I/O interface 166 includes one or more I/O ports to connect to corresponding I/O devices, such as external storage or supplemental devices, e.g., a printer or a PDA. In one implementation, the ports of the I/O interface 166 include ports such as: USB ports, PCMCIA ports, serial ports, and/or parallel ports. In another implementation, the I/O interface 166 includes a wireless interface for wireless communication with external devices. These I/O interfaces may be employed to connect to one or more content playback devices.

The network interface 168 allows connections with the local network and optionally with content playback device 12 and includes a wired and/or wireless network connection, such as an RJ-45 or Ethernet or "WiFi" interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and within the scope of the present invention.

For example, while several implementations of the invention include that the user select a particular content playback device for playback, in some implementations a user may browse content with no content playback device selected at all. In other implementations, a cache or cookie or other information may be employed to store information about content playback devices, so that no user choice is necessary. In another example, samples of content items may be obtained from content service providers, e.g., movie trailers, and these samples may be browsed freely without a user selection of a content playback device for playback. In another variation, a profile system may be employed that communicates content playback device information upon start-up according to a profile; e.g., a given content playback device may always be associated with and may authenticate itself with a given service provider. In this sense, a content playback device is still being chosen, but the choice does not require an affirmative step by the user. Use of any of these alternatives, or others, ensures that the content consumption of each content playback device is tracked. It further allows the proxy server to filter out content that the content playback device is incapable of playing. It is also noted that certain types of browsing may require no device at all, e.g., browsing shopping sites. Still, some level of customization may occur, e.g., by consideration of the origination location of the visiting second display's IP address.

In addition, the above description was primarily directed to an implementation in which the local IP address of the second display was retrieved and stored on the server. However, other ways of discovering the second display are also possible. For example, device discovery is also possible using a broadcast method within the local network. Compatible devices that recognize the broadcast message will respond with their necessary credentials and information to indicate their compliance with the web application for the second display. In many cases, broadcasting methods are primarily directed to native applications, not web applications; however, a broadcasting library may be employed to allow the implementation within a web application.

Accordingly, the present invention is not limited to only those implementations described above.

The invention claimed is:

1. A method of arranging a browsing session for content items for playback on a content playback device, comprising:
   i. establishing a user account session between a plurality of secondary mobile displays and a server, the secondary mobile displays further in communication with a plurality of common content playback devices, wherein the establishing a session between the secondary mobile displays and the server includes downloading an application from the server to each of the plurality of secondary mobile displays, the application configured to display, for each respective secondary mobile display:
      1. a first user interface element pertaining to the style of display, including:
         a. text in a first language and character font set associated with a user profile associated with the respective secondary mobile display;
         b. a background image associated with a user profile associated with the respective secondary mobile display; or
         c. a background layout associated with a user profile associated with the respective secondary mobile display;
      2. a second user interface element pertaining to content items or service providers, the second user interface element based on:
         a. a parental block rating level associated with a user profile associated with the respective secondary mobile display;
         b. a listing of favorite content items or services associated with a user profile associated with the respective secondary mobile display; or
         c. a listing of content items or services in a browsing history associated with a user profile associated with the respective secondary mobile display;
   ii. receiving an input from a user of a respective secondary mobile display, the input indicating a user alteration of the first user interface element;
   iii. changing the user interface of the respective application of the secondary mobile display, or sending a signal to change the user interface of the respective application of the secondary mobile display, according to the user alteration of the first user interface element;
   iv. receiving input from a user of the respective secondary mobile display, the input indicating a user alteration of the second user interface element;
   v. changing the user interface of the respective application of the secondary mobile device, or sending a signal to change the user interface of the respective application of the secondary mobile device, according to the user alteration of the second user interface element;
   vi. receiving an input from a user of the respective secondary mobile display of the plurality of secondary mobile displays, the input indicating a user selection of a content playback device from the plurality of common content playback devices;
   vii. causing a display of a list of content items on the secondary mobile display, wherein the items on the list are generated based on at least the selection of the second user interface element, and at least in part using a device characteristic of the selected common content playback device;
   viii. receiving an input from the user of the secondary mobile display of the plurality of secondary mobile displays, the input indicating a user selection of a content item on the list from a service provider; and
   ix. causing the selected content item to play back on the selected common content playback device.

2. The method of claim 1, further comprising displaying a list of content items on the secondary mobile display, and wherein the list is displayed according to the selection of the user interface element, and wherein the items on the list are generated at least in part using a list of content playback devices associated with the user account or using a list of content playback devices discovered by the secondary mobile display.

3. The method of claim 2, wherein the items on the list are generated at least in part using a list of service providers associated with the user account.

4. The method of claim 1, further comprising displaying a list of content playback devices associated with the user account or discovered by the secondary mobile display, wherein the list is displayed according to the selection of the user interface element.

5. The method of claim 1, wherein the causing the selected content item to playback on the content playback device includes causing the secondary mobile display of the plurality of secondary mobile displays on which the selection was received to communicate the selection to the common content playback device, for the common content playback device to request the content item using an authentication credential.

6. The method of claim 1, wherein the causing the selected content item to playback on the content playback device includes causing the secondary mobile display of the plurality of secondary mobile displays on which the selection was received to communicate the selection to a proxy server on behalf of the selected common content playback device.

7. The method of claim 1, wherein the receiving an input from a user, the input indicating a user selection of the user interface element, includes receiving data from a user profile.

8. The method of claim 1, wherein the changing the user interface of the respective application of the secondary mobile device includes changing the text to a second language and character font set or to a default language and character font set and wherein the changing the text includes translating the text.

9. The method of claim 1, wherein the application of the secondary mobile device is a web application or an application written in native code.

10. A non-transitory computer-readable medium, comprising instructions for causing a computing device to implement the method of claim 1.

11. A non-transitory computer-readable medium storing a program, for causing a secondary mobile display to perform the following steps, the secondary mobile display associated with at least one other secondary mobile display and a plurality of content playback devices:
   i. establishing a session between a secondary mobile display and a server, the session associated with a user account on the server, including:
      1. receive data about a plurality of common content playback devices associated with the user account; or
      2. receive data about a plurality of common content playback devices discovered by the secondary mobile display;
   ii. receiving an application on the secondary mobile display from the server;
   iii. executing the application on the secondary mobile display, the application configured to display:
      a. a first user interface element pertaining to the style of display, including:
         i. text in a first language and character font set associated with a user profile;
         ii. a background image associated with a user profile; or
         iii. a background layout associated with a user profile;
      b. a second user interface element pertaining to content items or service providers, the second user interface element based on:
         i. a parental block rating level associated with a user profile;
         ii. a listing of favorite content items or services associated with a user profile; or
         iii. a listing of content items or services in a browsing history associated with a user profile;
   iv. receiving an input from a user on the secondary mobile display, the input indicating a user alteration of the first user interface element;
   v. changing the user interface of the application on the secondary mobile display according to the alteration of the first user interface element;
   vi. receiving an input from a user on the secondary mobile device, the input indicating a user alteration of the second user interface element;
   vii. changing the user interface of the application on the secondary mobile display according to the alteration of the second user interface element;
   viii. receiving an input from a user of the secondary mobile display, the input indicating a user selection of a content playback device from the plurality of common content playback devices;
   ix. displaying a list of content items on the secondary mobile display, wherein the items on the list are generated based on at least the selection of the second user interface element, and at least in part using a device characteristic of the selected common content playback device;
   x. receiving an input from the user of the secondary mobile display, the input indicating a user selection of a content item on the list from a service provider; and
   xi. causing the selected content item to play back on the selected common content playback device.

12. The program of claim 11, wherein the secondary mobile display is further caused to perform the following additional steps:
   i. receiving a list of available content items from a server and display the list according to the selection;
   ii. receiving a selection of one or more of the available content items; and
   iii. transmitting one or more reference identifiers identifying the one or more respective content items to the server,
   iv. such that the one or more reference identifiers are configured to be employed at a server with an authentication credential of the content playback device to request from one or more respective service providers that the one or more content items be made accessible for playback on the selected common content playback device.

13. The program of claim 11, wherein the step of receiving data about a plurality of common content playback devices associated with the user account includes: receiving a selection from a user of a set of content playback devices associated with the user account, receiving data about a default content playback device, receiving data about a discovered content playback device, or receiving stored data about previously-used content playback devices.

14. The program of claim 11, wherein the secondary mobile display is selected from the group consisting of: a laptop computer, a tablet computer, a desktop computer, an internet appliance, and a smart phone.

15. The program of claim 12, wherein the program further causes the secondary mobile display to perform a step of receiving a list of available service providers.

16. The program of claim 12, wherein the step of transmitting one or more reference identifiers identifying the one or more respective content items to the server includes transmitting the reference identifiers directly to the selected common content playback device wherein the content playback device transmits a request to a service provider using its authentication credential for the identified content items.

17. The program of claim 16, wherein the transmitting directly includes transmitting using a transmission scheme including: wired transmissions, wireless transmissions, infrared transmissions, Bluetooth® transmissions, or over a local network.

18. The program of claim 11, wherein the step of transmitting one or more reference identifiers identifying the one or more respective content items to the server includes transmitting the reference identifiers to a proxy server on behalf of the selected common content playback device.

19. The program of claim 11, wherein the receiving an input from a user, the input indicating a user selection, includes receiving data from a user profile.

20. The method of claim 11, wherein the changing the user interface of the application of the secondary mobile device includes changing the text to a second language and character font set or to a default language and character font set and wherein the changing the text includes translating the text.

21. A non-transitory computer-readable medium storing a program, for causing a server to perform the following steps:
   i. receiving a request to establish a session with a plurality of secondary mobile displays, and upon proper user authentication establish a respective session with each of the secondary mobile displays, each session associated with a user account;
   ii. receiving data about a plurality of common content playback devices associated with the user account, the plurality of common content playback devices in network communication with the plurality of secondary mobile displays;

iii. transmitting to each secondary mobile display an application, the application allowing the respective secondary mobile display to browse content offerings of a service provider using the server, the application configured to display:
1. a first user interface element pertaining to the style of display, including:
   a. text in a first language and character font set associated with a user profile;
   b. a background image associated with a user profile; or
   c. a background layout associated with a user profile;
2. a second user interface element pertaining to content items are service providers, the second user interface element based on:
   a. a parental block rating level associated with a user profile;
   b. a listing of favorite content items or services associated with a user profile; or
   c. a listing of content items or services in a browsing history associated with a user profile;

iv. receiving an input from a user from a secondary mobile display of the plurality of secondary mobile displays, the input indicating a user alteration of the first user interface element;

v. transmitting a signal to change the user interface of the application on the secondary mobile display according to the alteration;

vi. receiving input from a user from a secondary mobile display of the plurality of secondary mobile display, the input indicating a user alteration of the second user interface element;

vii. transmitting a signal to change the user interface of the application on the secondary mobile display according to the alteration of the second user interface element;

viii. receiving an input from a user of the secondary mobile display of the plurality of secondary mobile displays, the input indicating a user selection of a content playback device from the plurality of common content playback devices;

ix. causing a display of a list of content items on the secondary mobile display, wherein the items on the list are generated based on at least the selection of the second user interface element and at least in part using a device characteristic of the selected common content playback device;

x. receiving an input from the user of the secondary mobile display of the plurality of secondary mobile displays, the input indicating a user selection of a content item on the list from a service provider; and xi. causing the selected content item to play back on the selected common content playback device.

22. The program of claim 21, wherein the server is further caused to perform the following additional steps:
i. transmitting to the secondary mobile display a list of available content items, the secondary mobile display displaying the list of available content items using the respective selection of the user interface element;
ii. receiving from the secondary mobile display a selection of one or more content items for playback; and
iii. transmitting to the service provider a request for the one or more content items to be made available for playback on the selected content playback device, the request including an authentication credential of the selected content playback device.

23. The program of claim 21, wherein the step of receiving data about a plurality of common content playback devices associated with the user account includes: receiving a selection from a user of one or a set of content playback devices associated with the user account, receiving data about a default content playback device, receiving data about a discovered content playback device, or receiving stored data about previously-used content playback devices.

24. The program of claim 21, wherein the server is further caused to perform the steps of:
i. transmitting to the secondary mobile display a list of available service providers;
ii. receiving from the secondary mobile display a selection of a first content item from one of the service providers;
iii. placing the first content item in a queue;
iv. receiving from the secondary mobile display a selection of a second content item from another of the service providers;
v. placing the second content item in a queue; and
vi. upon playback of each queued content item, providing to the respective service provider a service provider credential, the service provider credential associated with the user account and with the selected service provider.

25. The program of claim 23, further comprising customizing the transmitted list based on at least data about the plurality of common content playback devices.

26. The program of claim 21, wherein the receiving an input from a secondary mobile display, the input indicating a user selection of a user interface element, includes determining if a selection has been previously indicated by polling a user profile.

27. The program of claim 21, wherein the transmitting a signal to change the user interface of the application includes changing the text to a second language and character font set or to a default language and character font set, and wherein the changing the text includes translating the text.

* * * * *